United States Patent
Vail et al.

(10) Patent No.: US 10,886,723 B2
(45) Date of Patent: *Jan. 5, 2021

(54) ADAPTIVE SINGLE EVENT LATCHUP (SEL) CURRENT SURGE MITIGATION

(71) Applicant: Harris Corporation, Melbourne, FL (US)

(72) Inventors: David Vail, West Melbourne, FL (US); David Diedling, Rockledge, FL (US); William Boesch, West Melbourne, FL (US); Joshua P. Bruckmeyer, West Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 348 days.

This patent is subject to a terminal disclaimer.

(21) Appl. No.: 15/968,423

(22) Filed: May 1, 2018

(65) Prior Publication Data

US 2018/0248351 A1    Aug. 30, 2018

Related U.S. Application Data

(63) Continuation-in-part of application No. 14/814,699, filed on Jul. 31, 2015, now Pat. No. 9,960,593.

(51) Int. Cl.
*H02H 7/00* (2006.01)
*H02H 1/04* (2006.01)
(Continued)

(52) U.S. Cl.
CPC .............. *H02H 1/04* (2013.01); *H02H 5/005* (2013.01); *H02H 9/025* (2013.01)

(58) Field of Classification Search
None
See application file for complete search history.

(56) References Cited

U.S. PATENT DOCUMENTS

| 5,672,918 A | 9/1997 | Kimbrough et al. |
| 5,923,830 A | 7/1999 | Fuchs et al. |
| (Continued) | | |

OTHER PUBLICATIONS

Becker, Heidi N. et al., Latent Damage in CMOS Devices From Single-Event Latchup, IEEE Transactions on Nuclear Science, vol. 49, No. 6, Dec. 2002, 3009-3015.

(Continued)

*Primary Examiner* — Stephen W Jackson
(74) *Attorney, Agent, or Firm* — Fox Rothschild LLP; Robert J. Sacco; Carol E. Thorstad-Forsyth

(57) ABSTRACT

Method for SEL mitigation involves determining one or more base sets of signature vector components for each of a plurality of signal loading conditions experienced by a protected device in an operating state, each set of base signature vector components together comprising a base signature vector. The method further involves monitoring signature vector components for the protected device to determine a detected signature vector which is comprised of a set of detected signature vector components. The detected signature vector is compared to a dynamically selected base signature vector which is associated with the device state and signal loading condition which are currently active to differentiate between the occurrence of standard current surges associated with normal operation of the protected device and a non-standard current surge.

26 Claims, 6 Drawing Sheets

(51) Int. Cl.
*H02H 9/02* (2006.01)
*H02H 5/00* (2006.01)

(56) References Cited

U.S. PATENT DOCUMENTS

| | | |
|---|---|---|
| 6,799,288 B2 | 9/2004 | Kohnen et al. |
| 7,310,211 B2 | 12/2007 | Gruber et al. |
| 7,343,579 B2 | 3/2008 | Coxe et al. |
| 7,466,181 B2 | 12/2008 | Hynes |
| 7,492,560 B2 | 2/2009 | Hussein et al. |
| 8,378,696 B2 | 2/2013 | Buard et al. |
| 8,685,800 B2 | 4/2014 | Yang et al. |
| 8,896,978 B2 | 11/2014 | Baumann |
| 9,659,721 B1 | 5/2017 | Sastry et al. |
| 9,960,593 B2 * | 5/2018 | Vail ............ G01R 31/31816 |
| 2004/0145242 A1 | 7/2004 | Rodriguez et al. |
| 2008/0151456 A1 | 6/2008 | Julicher |

OTHER PUBLICATIONS

Dodds, N.A. et al., SEL-Sensitive Area Mapping and the Effects of Reflection and Diffraction From Metal Lines on Laser SEE Testing, IEEE Transactions on Nuclear Science, vol. 60, N. 4, Aug. 2013, 2550-2558.

Gokhale, Maya et al., Dynamic Reconfiguration for Management of Radiation-Induced Faults in FPGAs, Proceedings of the 18th International Parallel and Dsitributed Processing Symposium (IPDPS'04), IEEE, 2004 (6 pages).

Maurer, Richard H. et al, Harsh Environments: Space Radiation Environment, Effects, and Mitigation, Johns Hopkins APL Technical Digest, vol. 28, No. 1 (2008) 17-29.

Stamenkovic, Z. et al., Design Flow and Techniques for Fault-Tolerant ASIC, 2013 20th IEEE International Symposium on the Physical and Failure Analysis of Integrated Circuits (IPFA), 93-98.

* cited by examiner

ADAPTIVE SINGLE EVENT LATCHUP (SEL) CURRENT SURGE MITIGATION

CROSS-REFERENCE TO RELATED APPLICATION

This disclosure is related to and claims priority as a continuation in part to U.S. patent application Ser. No. 14/814,699 filed on Jul. 31, 2015.

BACKGROUND OF THE INVENTION

Statement of the Technical Field

The inventive arrangements relate to single event latchup (SEL) current surge mitigation techniques, and more particularly to adaptive methods and systems that facilitate the use of certain types of electronic devices in environments where they would otherwise be vulnerable to power surge problems.

Description of the Related Art

The operation of integrated circuits can be temporarily or permanently disrupted due to single event effects associated with exposure to energetic particles such as protons and heavy ions. These events can occur through various mechanisms including one which is known as single event latch-up (SEL). An SEL event can occur when a dense track of electron-hole pairs produced in a silicon die by an energetic ion triggers certain parasitic circuit elements that form a Silicon Controlled Rectifier (SCR) in the integrated circuit. If this parasitic SCR circuit is triggered, the resulting SEL current may damage or destroy the integrated circuit, unless the SEL current is properly limited or promptly removed. An SEL event can be caused by a single energetic ion depositing an electric charge in a sensitive location of an integrated circuit die. A more detailed discussion of the SEL problem and a parasitic SCR circuit which can result therefrom is discussed in U.S. Pat. No. 8,685,800. Another source that is useful for understanding SEL is "SEL-Sensitive Area Mapping and the Effects of Reflection and Diffraction From Metal Lines on Laser SEE Testing", by N. Dodds et al, IEEE Trans Nuc Sci, August 2013.

An SEL can occur between the power rails of an integrated circuit or any other location where the device includes the required parasitic structure. Accordingly, the SEL can be destructive if the resulting current draw within an integrated circuit is sufficient to damage the junction and or a wire bond which is associated with the device. SEL can cause latent internal damage that can subtlety degrade device reliability, which discourages the use of SEL-prone parts even if obvious device damage is not apparent. These types of subtle degradations are described in the paper "Latent Damage in CMOS Devices From Single-Event Latchup", by Becker, Miyhira, and Johnston (all from NASA-JPL), IEEE Trans on Nuc Sci, December 2002. Accordingly, the use of integrated circuits which are vulnerable to SEL is severely restricted in applications such as space programs where exposure to energetic ions is anticipated.

Various methods have been proposed for addressing the problem of single event latch-up detection in a circuit. Some of these systems rely on ion detection circuits to signal an SEL event. However, the fact that an ion impacts a detector does not provide information about ions hitting sensitive areas and causing a single event latchup. Other systems rely on detection of an overcurrent to signify an SEL event has occurred. For example, such a system is described in U.S. Pat. No. 7,492,560. But a simple current-limiting regulator does not address the problem of how to decide when a given current surge corresponds to SEL, nor does it solve the problem of SEL currents that are less than the maximum operating current for a device.

In order to enhance the detection of relatively small current variations produced by SEL, there is described in U.S. Pat. No. 7,310,211 a system in which an electronic circuit is subdivided into smaller groups of active circuit components which each draw a similar amount of current. By subdividing the electronic circuit in this way, an overcurrent caused by SEL in any one of the subdivided groups of active circuit components is more reliably distinguished. However, this approach is impractical when utilizing existing commercial off-the-shelf integrated circuit devices in which power cannot be internally subdivided. It also fails to address the importance of extremely fast detection of SEL events and fast response times, which are key for purposes of preventing damage to electronic circuits when SEL does occur.

Some commercial products are available to protect circuits from occurrences of SEL. For example, a conventional product for this purpose can include a current threshold comparator which is used to control a switch. The switch can include a series FET switch and a bipolar transistor crowbar circuit to control current to a protected device. When a current level exceeds a preset level, a power supply voltage is disconnected from the load (e.g., an integrated circuit device). Conventional devices used for this purpose are known make use of an FET power switch in series with the load. Still, such commercially available products do not discriminate between a "normal" power transient and a true "SEL" transient.

SUMMARY OF THE INVENTION

Embodiments of the invention concern a method for damage protection from SEL events. The method involves monitoring a plurality of signature vectors for a protected device. Each "signature vector" is defined here to be a set of one or more distinguishing characteristics which can potentially be used to distinguish between an SEL condition and normal operation. Accordingly, exemplary signature vectors can include (1) SEL current signal characteristics and features, (2) system state information (3) the logical state of the protected device, and/or (4) environment information. Each signature vector can be comprised of one or more signature vector components. For example, an SEL current signal type of signature vector could include signature vector components such as current magnitude and current rate of change.

A detected signature is derived from the plurality of signature vectors. The detected signature is comprised of a plurality of detected signature vector components that are associated with the plurality of signature vectors. The method also involves comparing the plurality of detected signature vector components to a plurality of predetermined signature vector components associated with at least one current surge signature. Based on the comparing, a determination is made to selectively differentiate between the occurrence of standard power surges associated with normal operation of the protected device and a non-standard current surge which requires cycling power of the protected device (or in some cases a particular power input bus) for continued proper functioning of the protected device. The method also involves selectively cycling the power applied to the protected device based on the results of the comparing step.

The invention also concerns a current surge mitigation system for ensuring reliable operation of a protected device, where the protected device is one that has a vulnerability to SEL, which can result in excessive power draw. The system also includes an adaptive current control circuit which monitors a plurality of signature vectors for the protected device and derives from the plurality of signature vectors a detected signature which is comprised of a plurality of detected signature vector components. A sensing circuit is provided which senses a magnitude of a power supply electric power current supplied to the protected device and communicates at least one said signature vector to the adaptive current controller which is representative of the current-versus-time waveform of a current transient. The adaptive current control circuit evaluates the plurality of detected signature vector components and the state of the system to detect the occurrence of SEL.

According to one aspect, the adaptive current control unit compares the detected information to information contained in a data store. The information contained in the data store can include information specifying a plurality of previously stored signature vector component data values associated with at least one current surge signature. Based on the comparing, the control circuit selectively differentiates between the occurrence of a standard current surge associated with normal operation of the protected device and a non-standard current surge which requires cycling power of the protected device for continued proper functioning of the protected device. The system can also include at least one output circuit of which selectively generates a trigger signal for cycling the power applied to the protected device (or in some cases a particular power input bus) when a non-standard current surge is identified.

The adaptive aspect of the invention allows current transient characteristics to be measured and recorded during system test, and optionally during on-orbit operation. This adaptive feature can be used to "train" the logic to recognize normal (but rare) current transients that may occur for example, at high operating temperatures or in combination with other system events. During normal pre-launch system checkout, any unusual current transients which do not match with the existing event signatures in the event data store can be recorded and reported, to optionally be added to the event data store. Note that for many systems, the adaptive current controller circuitry may be set up to assume that "unknown" current transient signatures could be an indication of a latchup event, requiring a temporary shutdown. For most systems, this "false alarm rate" needs to be minimized, but does not necessarily need to be zero.

In an alternative embodiment, the adaptive current control circuit can identify the occurrence of SEL when the detected signature vector components indicate the occurrence of a current transient having certain characteristics. More particularly SEL can be identified when a magnitude of the power supply current to the protected device changes with time at a rate that meets or exceeds a predetermined threshold and where the change in magnitude of the power supply current also exceeds a predetermined value. Based on system state, when these two criteria are satisfied, the adaptive current controller identifies the occurrence of SEL. In such a scenario, the signature vector components can include a predetermined rate of change in the current supplied to the protected device, and a minimum change in current magnitude, which when present in combination indicate the occurrence of SEL. These signature vector components can be stored in a data store. Alternatively, a conventional data store can be omitted and instead, dedicated analog or digital hardware can be designed to perform the necessary comparison. The dedicated circuit can evaluate the detected signature vector components and respond to the occurrence of specific vector components which are associated with SEL.

According to a further aspect, a solution is provided for SEL mitigation. The solution involves determining one or more base sets of signature vector components for each of a plurality of signal loading conditions experienced by a protected device in an operating state. Each set of base signature vector components together comprises a base signature vector. Thereafter, a plurality of signature vector components for the protected device are monitored to determine a detected signature vector which is comprised of a set of detected signature vector components. The detected signature vector is compared to a dynamically selected base signature vector which is associated with the device state and signal loading condition which are currently active. The comparison is used to differentiate between the occurrence of a standard current surge associated with normal operation of the protected device and a non-standard current surge. Different base signature vectors can be provided for various combinations of device state, device signal loading, device operating temperature. Further, base signature vectors can be advantageously determined for each specific individual protected device to account for variations associated with device fabrication processing.

BRIEF DESCRIPTION OF THE DRAWINGS

Embodiments will be described with reference to the following drawing figures, in which like numerals represent like items throughout the figures, and in which.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. However, the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

A conventional apparatus for SEL protection can include a current threshold comparator which is used to control a switch. When a current level exceeds a preset level, a power supply voltage is disconnected from a load (e.g., an integrated circuit device). However, these conventional protective devices have only a limited ability to distinguish between normal currents flowing into the target integrated circuit (IC) and abnormal currents associated with SEL. Further, conventional protective devices used for this purpose are known make use of an FET power switch in series with the IC load. Such an arrangement can be effective, but adds a voltage drop to the power bus of the target IC, and the response time may be too slow to adequately protect the target IC from latent damage. To assure minimal risk to a protected device, a power supply voltage should preferably be turned off within approximately 1 microsecond. The importance of a rapid response time is discussed in further detail in the paper "Latent Damage in CMOS Devices From Single-Event Latchup", by Becker, Miyhira, and Johnston (all from NASA-JPL), IEEE Trans on Nuc Sci, December 2002.

Figure 1:
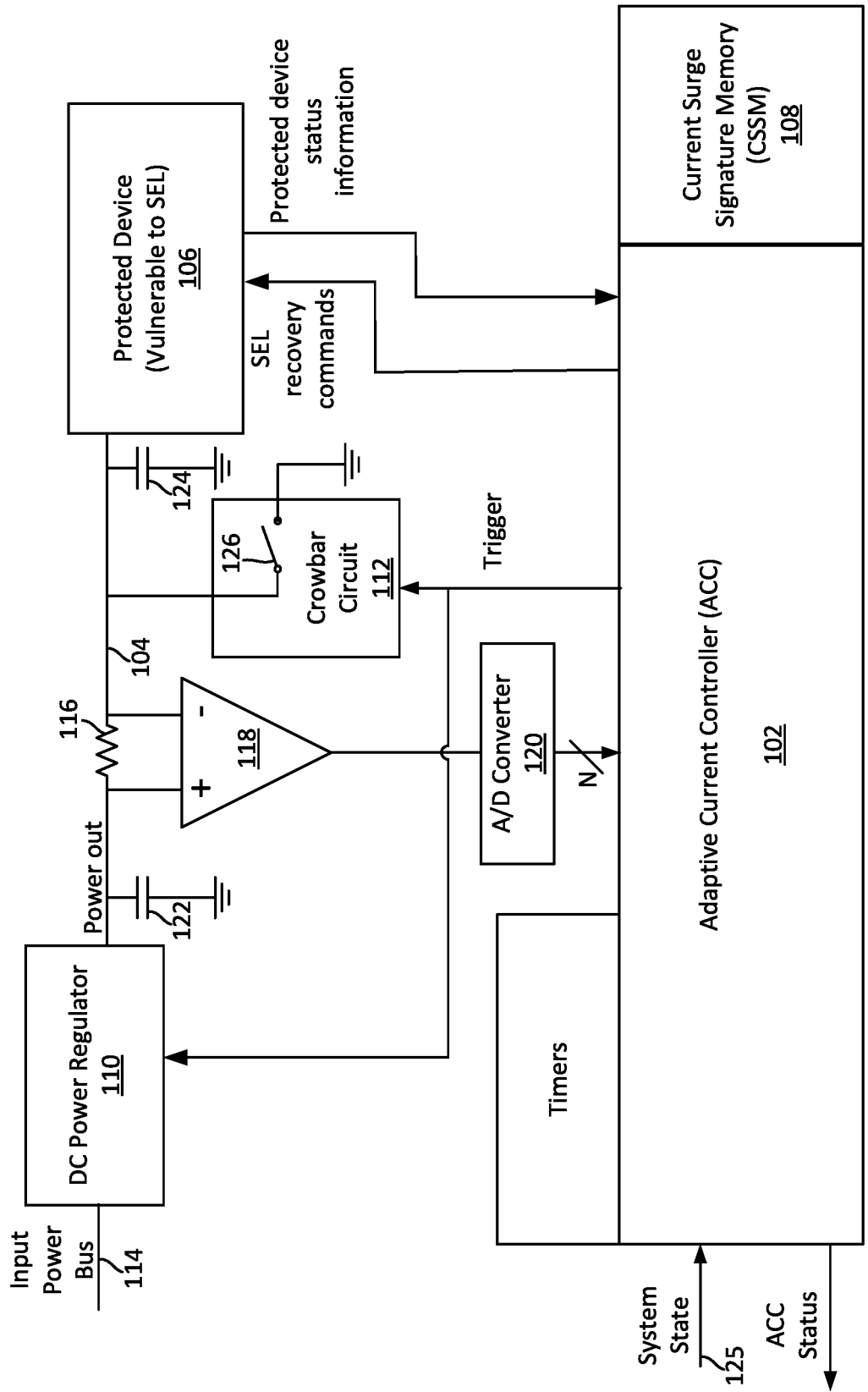
FIG. 1 is a block diagram that is useful for understanding an adaptive surge protection system in accordance with the inventive arrangements.

Referring now to FIG. 1, a system and method is disclosed for mitigating radiation induced SEL. The approach described herein utilizes an adaptive current controller (ACC) 102. The ACC can be trained under controlled conditions to recognize signatures of different types of current surges which can occur on a protected device power bus 104 supplying power to an SEL vulnerable device which is to be protected (e.g., protected device 106). These different types of power surges include standard operation power surges which can and do occur during normal operation of the protected device, and SEL power surges which arise only in connection with an SEL occurrence. Signatures associated with these various types of surges are stored in a Current Surge Signature Memory (CSSM) 108.

Signatures associated with these various types of surges are determined based on one or more signature vectors. Each signature vector is a set of information specifying certain distinguishing characteristics that can be potentially used to distinguish between an SEL condition and normal operation of a protected device. Exemplary signature vectors can include (1) SEL current signal characteristics and features, (2) system state information (3) the logical state of the protected device, and/or (4) environment information. Each signature vector is comprised of one or more signature vector components. For example, an SEL current signal type of signature vector could include signature vector components such as instantaneous current magnitude, current rate of change, information concerning the presence and timing of current signal transients, and so on. Other signature vectors may be comprised of only a single signature vector component. For example, if a signature vector is provided for a logical state of a protected device, then a single signature vector component can be provided to specify whether the device is in an active state or a standby state. The signatures stored in the CSSM allow the ACC to accurately distinguish between standard power surges which occur during normal device operations, and SEL power surges which are associated with an SEL occurrence.

During operation, if the ACC 102 detects a current surge that sufficiently matches a signature of an SEL power surge, or if it detects a surge that does not match a known (non-SEL) surge stored in the CSSM, then the ACC will quickly terminate the application of power to the protected device 106. It accomplishes this result by performing two actions, which can include (1) disabling a DC power regulator 110 that is used as a power source for powering the protected device 106, and (2) triggering a crowbar circuit 112 to thereby clamp protected device power bus 104 at a voltage near ground potential. These actions can be performed concurrently using a common trigger signal as shown.

As shown in FIG. 1, an adaptive current controller system for mitigating radiation induced SEL can include certain components which facilitate monitoring a current flow to a protected device 106 through a protected device power bus 104. Any suitable arrangement can be used to facilitate current sensing. In the embodiment shown in FIG. 1, the current sensing circuit can include a sense resistor 116 which is disposed in series with a protected device power bus 104. The sense resistor can be a relatively small value resistance so as to minimize the voltage drop from the regulator output, and also minimize the impedance from the device power bus 104 to the main bank of bypass capacitors 122. For example, in some embodiments the sense resistor can have a value of approximately 0.04 ohm. Of course, the invention is not limited in this regard and other sense resistor values can be selected for a particular application. Also, it should be appreciated that other current sensing techniques are possible. For example, instead of a sense resistor 116, a current sense transformer or a Hall-effect sensor could instead be used to sense current flow. Current sensing circuits and sensor arrangements are well known in the art and therefore will not be described here in detail. However, it should be appreciated that any suitable current sensing arrangement can be used for the purposes described herein provided that it has a sufficient bandwidth to accurately sense current transients associated with SEL.

The voltage across the sense resistor can be detected by any suitable means. The voltage across the sense resistor will be directly related to the magnitude of the current flowing to the protected device 106. Accordingly, by monitoring the voltage across the sense resistor, an instantaneous indication of current flow to the protected devices can be obtained. According to one aspect of the invention, a differential amplifier 118 is provided to detect the voltage difference across the sense resistor 116. In the embodiment shown in FIG. 1, the output of the differential amplifier is communicated to the input of a high-speed analog-to-digital (A/D) converter 120. The A/D converter receives the analog voltage output of the differential amplifier 118 and converts it to an N-bit digital output signal. The N-bit digital output signal is communicated to an input of the ACC.

The ACC periodically receives the digitized output from A/D converter 120 and uses such information to evaluate the technical characteristics of a current surge. The A/D conversion rate is selected to be sufficiently high such that rapid variations in current during surge events can be detected. For example, the conversion rate of the A/D converter is preferably chosen having a sample rate of at least 10 MHz, for current transient waveforms with 1 microsecond risetimes.

The information the ACC receives from the A/D converter 120 can be combined with the system state 125 and used to determine variations in the electrical current flowing to the protected device 106 based on the voltage variations across the sense resistor 116. Using this information the ACC can determine certain characteristics or vector components of a detected power surge. For example, such information can include instantaneous current magnitude in protected device power bus 104, the rate of change in such current during a surge event, the profile of a variation in current magnitude over a period of time associated with a surge event (i.e., how the current varies over the course of the surge event), and the system state (or state transition) during the a current surge. The ACC can compare this information to signature vector components of one or more current surge signatures stored in CSSM 108 for purposes of determining whether a current surge corresponds to an SEL occurrence.

Additional information is advantageously evaluated by the ACC for the purpose of determining whether a current surge corresponds to an SEL occurrence. For example, such information can include protected device status information. It will be appreciated that different types of current can normally be expected to occur during various different operating associated with the protected device. Accordingly, it is useful for the ACC to consider the operational status of the protected device 106 when attempting to determine whether a current surge corresponds to an SEL occurrence. This information can be provided to the ACC from the protected device 106 as shown in FIG. 1. Other information which can be evaluated by the ACC can include system state information 125 in which the protected device 106 is utilized. Different system conditions are expected to result in the occurrence of various types of power surges, for example during initial power up, mode changes, target acquisition, etc. Accordingly, knowledge of the current system state is useful for evaluating whether a particular current surge is associated with an SEL occurrence.

The ACC compares the information received to the signature vector component data stored in CSSM 108 to determine whether a particular current surge is related to an SEL occurrence. Any suitable method can be used for performing this evaluation. When a surge occurs, the ACC evaluates the received information about the current surge to determine a current surge signature which most closely corresponds to current conditions. If the conditions correspond to an SEL type power surge, or if it detects a surge that does not match a known surge stored in the CSSM, then the ACC generates a triggers signal to the crowbar circuit 112 and the DC power regulator 110 as described above.

It should be appreciated that while use of an A/D converter as described herein is useful to facilitate current sensing, an A/D converter is not always necessary for detecting SEL with respect to some protected devices. For example, in some scenarios, instead of using an A/D converter, an analog comparator circuit can be used to sense the output of amplifier 118. The comparator circuit can be arranged so that it is triggered when the output from amplifier 118 indicates that a current transient has occurred which exceeds a certain specified value (e.g., 80 mA). For certain devices, it can be determined that such transients occur only due to 1 of 2 reasons: (1) an SEL event has occurred, or (2) there has been a commanded system state change, such as a re-configuration. The ACC logic is aware of the system state changes, and can mask off triggering on these expected transients. Consequently, the ACC logic can ensure that the crowbar circuit 112 is only triggered in response to genuine SEL transients. Still, it will be appreciated that such alternative SEL sensing and detection methods will not be suitable for all SEL-vulnerable devices.

If the characteristics associated with an SEL surge are sufficiently distinctive, it will provide a highly recognizable surge signature and the ACC error rate will be very low. Upsets to the analog circuitry and the ACC logic can be sources of false positive detections, although mitigations for these effects can also be implemented using standard techniques. Occasional false positive SEL detections can be tolerated, if the false positive rate is sufficiently low. If relatively slower shutdown times can be tolerated, and if a detected current surge signature indicates with some uncertainty that an SEL possibly has occurred, the ACC could (optionally) command the protected IC device to a low power idle state. Thereafter, if the current increase still persists, then a conclusion may be drawn that SEL must have occurred, in which case power can be removed entirely in the manner described above. If the current increase does not persist, then power cycling is not required and the system can quickly return to normal operation.

The ACC 102 can be any suitable digital and/or analog control logic element that is capable of performing the operations and actions described herein. Accordingly, the ACC 102 can include one or more of a microcontroller, application-specific integrated circuits (ASIC), field-programmable gate array (FPGA), and analog circuitry. Some embodiments may implement certain ACC functions in two or more specific interconnected hardware modules or devices with related control and data signals communicated between and through the modules, or as portions of an application-specific integrated circuit. Thus, the exemplary system is applicable to software, firmware, and hardware implementations.

A crowbar circuit 112 as described herein provides a short circuit or low resistance from the protected device power bus 104 to ground. This is conceptually illustrated in FIG. 1 by a normally open switch 126, which closes when a trigger signal is received from the ACC 102. Closing switch 126 forms a low impedance path from the protected device power bus 104 to ground. The low impedance path quickly prevents an overcurrent condition occurring with respect to the protected device 106, and thereby limits potential damage to the protected device.

Crowbar circuits are well known in the art and therefore will not be described here in detail. However, it will be appreciated by those skilled in the art that two of the most common electronic circuit components which are used to implement the switch 126 in a crowbar circuit 112 are the MOSFET and/or bipolar transistor(s). A MOSFET type crowbar circuit can operate very quickly (e.g. less than 0.2 microseconds after the trigger signal is applied) to drive the power supply voltage on protected device power bus 104 down to a very low level (e.g., approximating ground voltage). Notably, a 0.2 microsecond response time associated with the crowbar circuit 112 can be expected to help prevent latent SEL damage to the protected device, in conjunction with the other ACC circuitry. The total ACC reaction time between the occurrence of the SEL event and shutdown of the power bus should preferably be less than 1 microsecond, as explained in the paper "Latent Damage in CMOS Devices From Single-Event Latchup", by Becker, Miyhira, and Johnston (all from NASA-JPL), IEEE Trans on Nuc Sci, December 2002. Although a MOSFET type crowbar is generally preferred for the purposes of implementing the crowbar circuit 112, it should be understood that the invention is not limited in this regard, and other types of crowbar implementations may be used in some scenarios.

Concurrently disabling DC power regulator 110 can help prevent damage to the DC power regulator and also protects the power source (not shown) or input power bus 114 for the larger system. In this regard it may be noted that a commercially available DC power regulator of the kind described herein is usually protected with an internal current limit. This internal current limiter will be the primary means of protecting the DC power regulator in the event of an SEL occurrence, since the turn-off time of the regulator may be relatively slow.

One or more bypass or filter capacitors 122, 124 can be provided to control electrical noise from the protected device power bus 104. Capacitor 124 represents the high frequency bypass capacitors that can be part of the IC package, or even integrated onto the IC die itself. It will be appreciated that the location of capacitor 124 is such that it actually has the potential to slow down the detection time. In this regard it will be noted that the detection and reaction time is slowed by the magnitude of total capacitance. To achieve fast crowbar pulldown times as described below, capacitor 124 is advantageously selected to be a relatively small value, so that the time constant of the crowbar on resistance and capacitor 124 is small compared to the 1 microsecond total SEL-to-shutdown reaction time of the ACC.

Powering down a protected device unexpectedly can necessitate a device recovery process whereby the protected device is once again powered up for normal operation. Accordingly, after an SEL occurrence which requires disabling power to the protected device 106, one or more recovery commands may be used to facilitate restoration of the protected device to its normal operating mode. For example, consider a scenario where the protected device is a processing element such as a field programmable gate array (FPGA). In such a scenario, the ACC 102 can generate one or more signals or digital commands after an SEL-related power shutdown to facilitate an FPGA system reboot. For convenience, these and other commands associated with recovery of the protected device after system power-down, are referred to herein as SEL recovery commands. The ACC 102 can communicate at the appropriate time one or more such SEL recovery commands to the protected device to reinitiate its fully operational status. In some scenarios a higher-level system controller (not shown in the diagrams) will implement the full SEL recovery process. This could involve resetting data-gathering functions of the mission. The "ACC Status" output from ACC 102 can be used to inform the higher-level system controller of the situation, to determine the optimum recovery procedure.

ACC Training

According to certain aspects of the inventive arrangements described herein, it may be necessary to collect in advance current surge signature information under controlled conditions. This current signature information can include signature vector component data associated with one or more signature vectors as described herein.

The current signature information can be stored and subsequently used by the ACC as described herein to distinguish between normal or standard current surge events and SEL current surges. The collection of such vector component data under controlled conditions is an important step for purposes of obtaining baseline information against which a real time set of detected signature data can be compared. In some scenarios, it may be sufficient to identify and characterize all current surges associated with normal operation of a protected device. Thereafter, any detected current surges having a set of characteristics which do not conform to recognizable normal or standard current surges can be understood to correspond to SEL events. Alternatively (or in addition to characterizing such normal types of current surges), actual SEL events can be triggered under controlled conditions and the resulting current signatures can be characterized using one or more signature vectors. Exemplary processes of collecting signature data associated with normal or standard current surges and SEL current surges will now be described in further detail.

During controlled training of the ACC 102, the signatures of normal or standard current surge events are recorded. More particularly, signature vector components associated with various signature vectors are measured or detected under various normal operating conditions. The vector component information is then stored in a table and associated with that particular type of power surge. A test setup which is the same or similar to the arrangement shown in FIG. 1 can be used to facilitate recording signature vector component data.

During controlled training, standard current surge signature information can be collected for various operating modes or conditions which are normally associated with the protected device 106. Operating modes and/or conditions can include initialize state, standby state, normal operation, transmit mode (in the case of a transceiver) and so on. Controlled evaluation will reveal the occurrence of one or more standard current surge types, each having a well-defined set of signature vector components associated with each signature vector. These signature vector component values can be associated with power surges that occur under certain operating mode or condition. The combination of standard signature vector components associated with standard current surges for each mode or condition are collected stored in a memory or database.

During the controlled training of the ACC 102, the signature vector component data for SEL type power surges can also be collected. As is known, SEL occurrences are caused by an energetic ion depositing an electrical charge in an SEL sensitive location of an integrated circuit die. More particularly, an SEL is typically induced by a charged particle (i.e. an ion) depositing a sufficient charge that activates the SCR latchup structure. To produce an occurrence of SEL under controlled conditions, a sample of the protected device 106 is exposed to energetic ions by using a suitable particle accelerator, such as a cyclotron to bombard the protected device with heavy ions. Alternatively, SEL can be induced in the protected device by using a laser beam. For example, see the paper "SEL-Sensitive Area Mapping and the Effects of Reflection and Diffraction From Metal Lines on Laser SEE Testing", by N. Dodds et al, IEEE Trans Nuc Sci, August 2013. As a result of such exposure, the SEL susceptible protected device 106 can be expected to exhibit SEL, but under a controlled condition. When SEL occurs within the protected device 106, it will produce an SEL induced current surge at the protected device power bus 104. The various signature vector components associated with such SEL induced current surge can be measured and/or detected. The vector component information can then be identified in association with an SEL current surge type and stored in a table or memory.

Signatures Vector Components

As noted above, the signature vector components can include various different technical characteristics which are useful for uniquely identifying a particular current surge type associated with a specific condition. As such, a signature vector component can constitute raw measured data measurements or can include data which has been processed by the ACC to facilitate signature comparison. One example of a signature vector component is current magnitude in a protected device power bus 104. A particular condition (or set of conditions) may cause the magnitude of current flowing in the power bus to increase to a certain value (or exceed a certain value) for some period of time. But current magnitude alone may not be sufficient to differentiate an SEL caused current surge from other types of power surges. Accordingly, it is useful to consider other signature vector components that are useful for characterizing the surge.

A second current surge signature vector component can include a rate of change in the magnitude of current flowing in the power bus associated with a protected device. When a current surge occurs, it is expected that the current magnitude will increase from a normal operating range to a substantially higher value. The instantaneous rate of change in current magnitude versus time during this transition can serve as a useful signature vector component that is indicative with respect to the cause of the power surge. For example, the current rise time on a protected device power bus 104 under conditions associated with SEL type power surges is often faster than other types of power surges which are expected to occur during normal operating conditions.

Current variations in the protected device power bus 104 can be measured indirectly based on the voltage across sense resistor 116. One or more timing circuits or timers 128 can be provided to facilitate such current rate of change measurements. Accordingly, the instantaneous rate of change in current associated with current surge events (standard power surges and SEL power surges) can be measured, characterized and stored as one of the signature vector components described herein. A signature vector component can also specify or otherwise indicate the time it takes for the power bus electric current supplied to the protected device to fully transition from a first current magnitude value associated with a normal (non-power surge) operation of the protected device to a second current magnitude value associated with a current surge condition.

Figure 2:
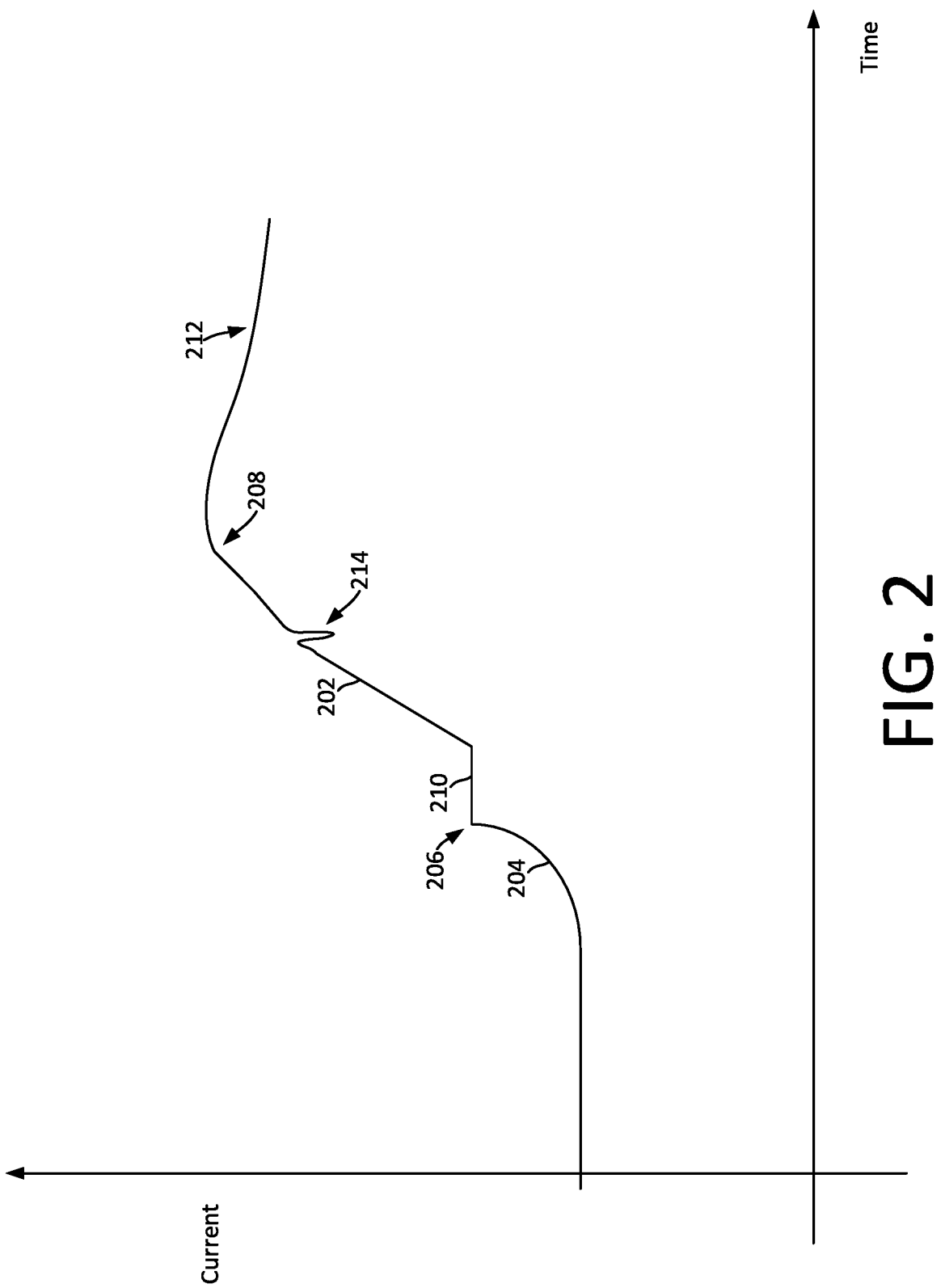
FIG. 2 is an exemplary plot of current versus time that is useful for illustrating certain characteristics that may be present in a time varying signal representing current magnitude.

Aside from instantaneous rate of change, it will be appreciated that current magnitude associated with a current surge can vary over time in accordance with a unique pattern or profile. For example, with reference to FIG. 2 it may be observed that an increase in current magnitude can occur linearly 202 or exponentially 204 over time. The increase may exhibit certain break points 206, 208 where changes occur in the rate or profile associated with the increase in current magnitude. The current magnitude may plateau 210 at certain levels before increasing further, tapering 212 or remaining at some peak level. The time duration between occurrences of such events may also be an important signature vector component. Finally, high frequency transient patterns 214 may occur with respect to the current magnitude as it increases from its normal value to its maximum surge value. Accordingly, a further signature vector component can include a single one of these features or a combination of such features. Signature vector components as described herein can facilitate uniquely identifying an SEL current surge versus standard types of power surges that occur during normal operations.

Variations in current magnitude as described herein can be an important indicator for purposes of identifying the underlying cause of a particular current surge. However, to place such information in proper context, it is also valuable for the ACC to have information concerning the operational status of the protected device. Such information can include a temperature of the protected device, the operating mode of the protected device, or any other information or data available from the detected device that is useful for understanding the operational context. This information can be provided to the ACC in the form of other signature vectors comprising other types of signature vector components.

Finally, it will be appreciated that a protected device 106 as described herein will often be included as part of a larger host system that is supported by the protected device. The state of the host system can offer valuable insights into the nature of a particular power surge. For example, in a transceiver system, a protected device 106 may experience different types of current surges during system initiation, standby mode, transmit mode and receive mode. A particular set of signature vector components which are completely normal or expected during one such mode (e.g. transmit mode), may conversely indicate the presence of an SEL event when the host system is operating in a different mode (e.g. a standby mode). So the context of the host system is a further important signature vector component which is evaluated by the ACC 102 when evaluating a current surge event. Evaluation of Signature Vector components.

The ACC 102 can use any suitable method for purposes of evaluating whether a particular set of detected operating parameters correspond to a particular type of current surge event. According to one aspect, the ACC can require that all of the detected signature vector components associated with a plurality of signature vectors match or fall within a range of a set of signature vector components stored in the CSSM 108 before generating a trigger signal to the crowbar circuit 112 and DC power regulator 110. According to a further aspect, the significance of the various signature vectors and/or signature vector components can be weighted in a predetermined manner in accordance with their perceived level of relevance. The set of detected signature vector components could be scored against signature vector component data of previously stored signatures contained in the CSSM 108 to determine the extent to which a currently detected set of signature vector components is correlated to each of a plurality of stored signatures. A sufficiently high correlation with a SEL current surge signature type could then be used as a basis to trigger the crowbar circuit 112 and DC power regulator 110 as described herein. More sophisticated numerical based curve fitting or comparison methods could also be used to compare signature vector components (e.g. signature vector components 202-214) to corresponding sets of stored signature vector components.

According to one aspect of the invention, an SEL current surge can be identified when one or more of the signature vector components indicate that a specific step increase in current flowing to a protected device has occurred. For example, an SEL current surge could be identified where the increase exceeds some predetermined value, or is within some predetermined range. In other scenarios, the SEL current surge can be identified when a minimum predetermined increase in current occurs within some predetermined period of time which is very brief. In still other scenarios, an SEL current surge can be identified when the rate of current change associated with the step increase exceeds some predetermined value, or has certain current profile characteristics. Such signature vector components are advantageously evaluated in conjunction with of other signature vector components such as protected device status, and/or host system status.

The ACC can provide one or more output status indicator signals to reflect its current status to the host system. These status indicator signals can be important for informing the host system that the protected device has experienced an SEL event and has been temporarily powered down. After an SEL occurrence, a power reset may be sufficient to return the protected device to full operational function. Accordingly, the ACC is advantageously arranged to reset the crowbar circuit and DC power regulator to their normal operating mode after some brief power reset time. This reset operation can involve opening switch 126 and once again enabling output power from the DC power regulator 110. In the event of a protected device being powered down, the host system may need to re-load certain data or operating instructions to reinitiate operation of the protected device. For some systems, power supply sequencing must be managed by the host system, to prevent possible damage. Accordingly, the ACC status indicator can also indicate when power has been restored to the protected device so that the necessary data or operating instructions can be loaded at that time.

Figure 3:
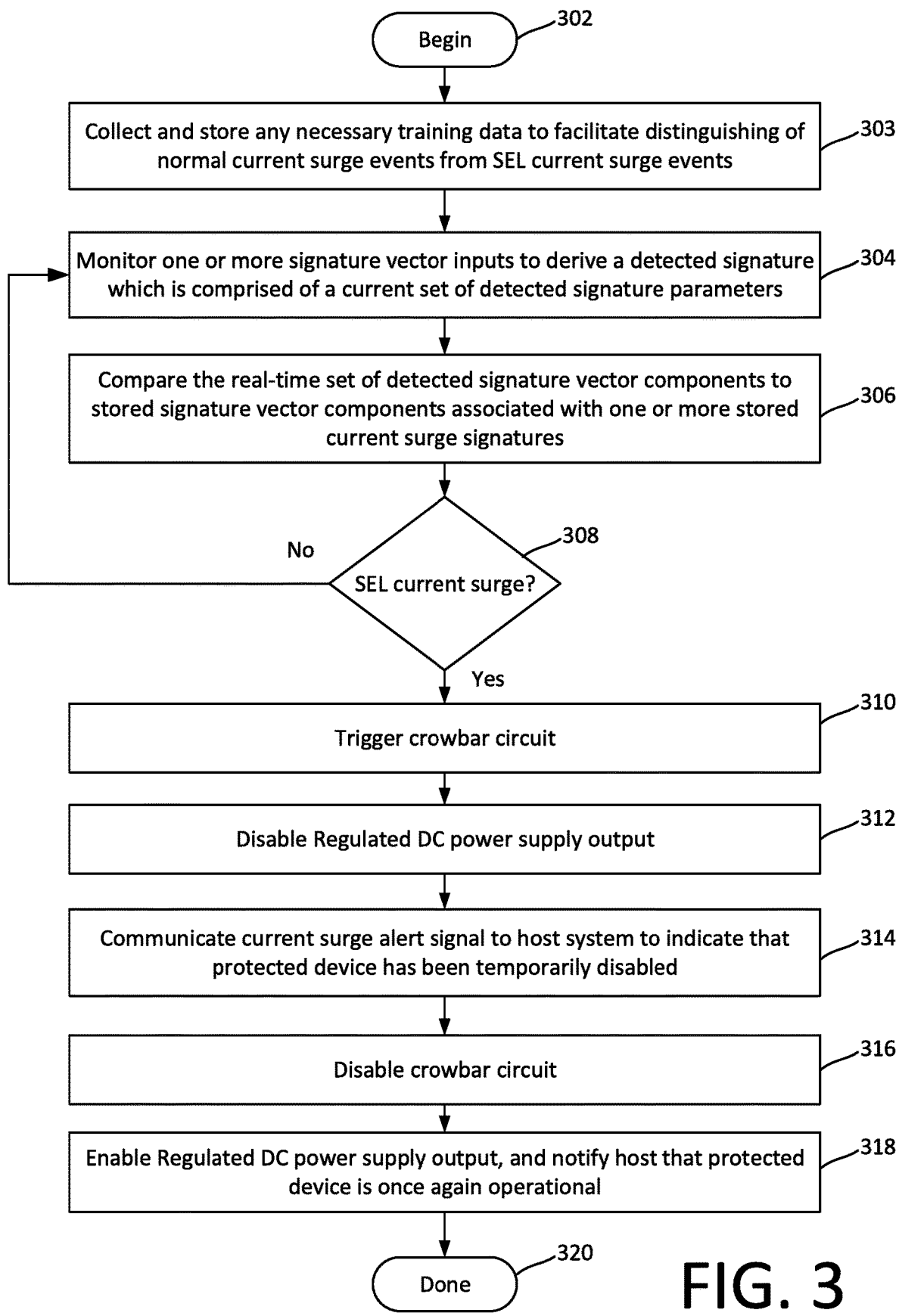
FIG. 3 is a flowchart that is useful for understanding a method for adaptive surge protection.

A flowchart is shown in FIG. 3 which is useful for understanding a method or process for adaptive current control to protect against SEL occurrences. The process begins at 302. At step 303 any necessary training data is collected and then stored to facilitate the ability to distinguish normal or standard current surge events from SEL current surge events. Once this data has been collected for different types of current surge events under controlled conditions, the process can continue on to 304 where one or more signature vector inputs are monitored by ACC 102 to derive a detected signature which is comprised of a current set of detected signature vector components. These detected signature vector components can include real-time information as described above concerning current flow to a protected device 106. The detected signature vector components can also include status information pertaining to the protected device and the host system in which the protected device is installed. At 306, the real-time set of detected signature vector components are compared by the ACC to stored signature vector components associated with one or more stored current surge signatures. Based on the comparison, a determination is made at 308 as to whether an SEL based current surge has occurred. This step can also include a determination that a non-SEL based current surge has occur. If no SEL current surge has occurred (308: No) then the ACC can continue monitoring signature inputs. However, if an SEL current surge is detected (308: Yes), then a trigger is initiated at 310 to activate crowbar circuit 112. The output of DC power regulator 110 is concurrently disabled at 312. Further, an SEL current surge alert signal can be communicated to a host system at 314 as an indication that the protected device has been temporarily disabled.

Once the power applied to the protected device 106 has been disabled as described herein, the protected device should unlatch, and power can be restored. For some systems, the unlatching will occur as part of a full power cycle of the system, so that power sequencing rules can be followed. This process of disabling and then re-applying power is sometimes referred to herein as cycling the power applied to the protected device. At 316 the crowbar circuit 112 can be disabled after a brief period of time so that the power input to the protected device is no longer connected to ground though the low impedance path. Once the crowbar circuit is disabled at 316, the DC regulated power supply can also be re-enabled at 318 so that it once again supplies power to the protected device. Concurrently, a re-initiate signal can be sent at from the ACC 102 to the host system to indicate that power has been restored to the protected device. The host system can optionally use this signal as an indication that the protected device is ready to function or ready to receive initiation commands and/or data. The process then terminates at 320 or returns to 304 so that monitoring can continue.

From the foregoing discussion, it will be understood that various types of detected signature vectors comprising various signature vector components can be used to identify the occurrence of an SEL. With certain types of protected devices, an occurrence of SEL can be accurately identified based on specific vector components, including the system and device state, and the a rate of change and change in magnitude of a power supply current into a protected device power supply bus 104. In such a scenario, a combination of these power and state vector components can be thought of as the detected signature.

Figure 4:
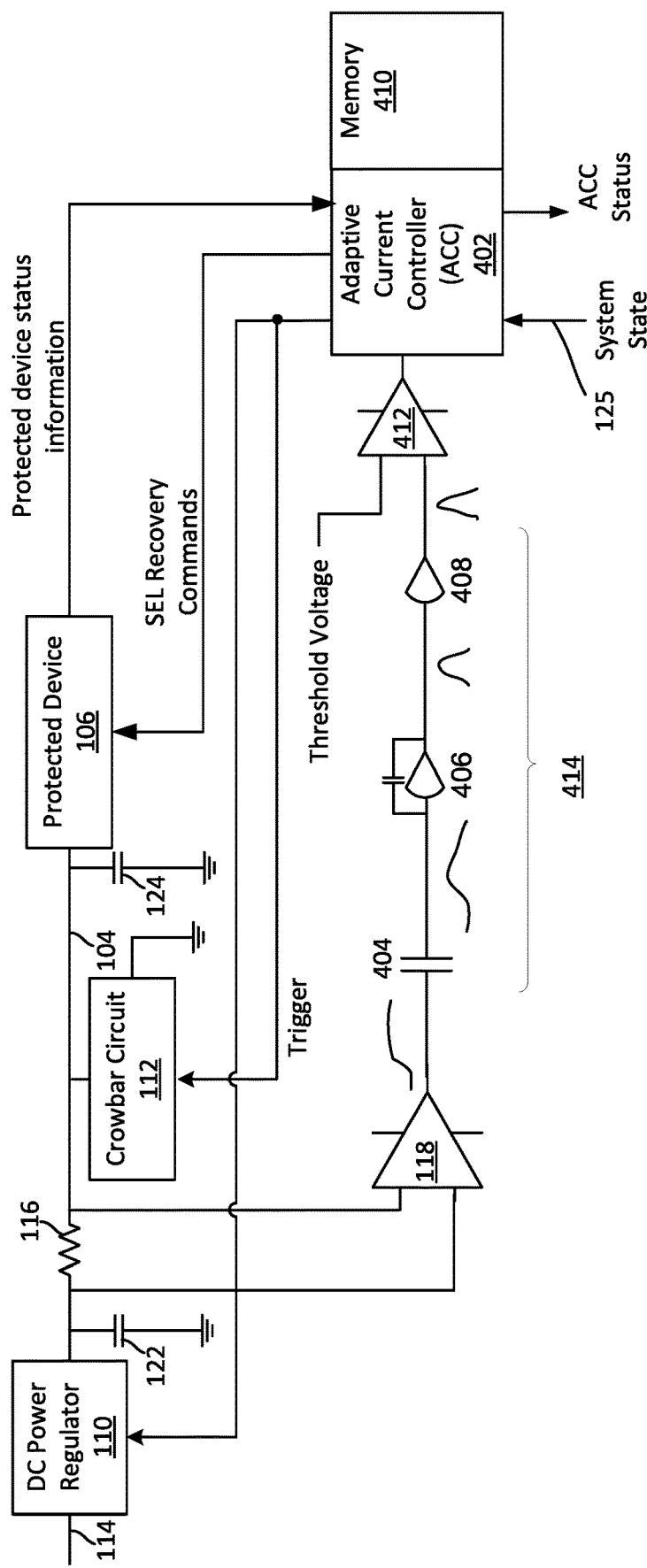
FIG. 4 is a block diagram that is useful for understanding an alternative embodiment of an adaptive current controller in accordance with the inventive arrangements.

Referring now to FIG. 4, there is shown an alternative embodiment of an adaptive surge protection system which can be used to identify SEL based on system state, plus the change in current magnitude and rate of change. The system shown in FIG. 4 is similar to the system shown in FIG. 1 in some respects. Accordingly, it can be observed that the system in FIG. 4 includes certain components which facilitate monitoring a current flow to a protected device 106 through a protected device power bus 104. As with the system shown in FIG. 1, any suitable arrangement can be used to facilitate current sensing. In the embodiment shown in FIG. 4, the current sensing circuit includes a sense resistor 116 which is disposed in series with a protected device power bus 104. One or more bypass or filter capacitors 122, 124 are provided to control electrical noise from the protected device power bus 104. The system in FIG. 4 also includes a differential amplifier 118 to detect the voltage difference across the sense resistor 116, and a crowbar circuit 112 which is similar to the crowbar circuit shown and described with respect to FIG. 1.

In FIG. 4, the output of the differential amplifier circuit 118 is coupled to a DC blocking capacitor 404. A second terminal of the DC blocking capacitor is coupled to the input of a pulse forming integrator 406. The output of the pulse forming integrator is coupled to a signal amplifier 408, which provides an amplified output signal to a high speed comparator 412. The combination of the blocking capacitor 404, the pulse forming integrator 406 and the signal amplifier 408 comprise a signal conditioning circuit 414. The signal conditioning circuit processes output signals received from differential amplifier 118 to facilitate comparison of certain detected current surge signature vector components to a plurality of previously determined signature vector components. The comparison of the two detected vector components (current magnitude and rate of change) to a plurality of predetermined signature vector components occurs concurrently at a voltage comparator 412.

In the circuit shown in FIG. 4, the differential amplifier 118 will output current signature vectors which can be characterized by two or more detected signature vector components. When an SEL event occurs in the protected device 106, it will produce a current signature at the output of differential amplifier 118. For example, the current signature vector will indicate a rapid rise in current in accordance with a known rate of change, and will indicate a change in current magnitude (after the rapid increase) which exceeds some predetermined amount. When these current conditions are detected, the controller logic 402 can further utilize system state information to determine with high reliability that an SEL event has occurred.

In order to detect the presence of SEL in this embodiment, the output signal from the differential amplifier 118 is coupled to the pulse forming integrator 406 through the DC blocking capacitor 404. The DC blocking capacitor strips the DC portion of the signal away to ensure that the signal that is passed is representative of the delta current (change in current), independent of the starting DC current value. The DC blocking capacitor also functions as a very low frequency cutoff filter which performs an averaging function. After passing through the DC blocking capacitor, the signal is passed to the pulse forming integrator 406 which converts the delta current signal to a pulsed signal. The pulsed signal will have a pulse amplitude that is proportional to the magnitude and rate of change in current indicated by the output from the differential amplifier 118. Once the pulsed signal is generated at 406, it can be passed to a signal amplifier 408 for amplification.

The pulsed signal output from signal amplifier 408 is subsequently compared to a threshold voltage at high speed comparator 412. The output of the high speed comparator 412 goes from low to high when the magnitude of the pulsed output of signal amplifier 408 exceeds a threshold reference voltage value, which value may be programmable. This comparator output signal is then used to signal supporting firmware in the ACC 402 that an event of suitable speed and magnitude correlating to a probable latchup event has occurred. The firmware, which can be stored in memory 410, will determine if the current increase was expected or anticipated based upon the current operating state of the protected device, and/or system state. If the current increase was not expected based on current known operating conditions, then the firmware activates a crowbar circuit 112, and disables the DC power regulator 110.

In some scenarios, a pulse width discriminator circuit (not shown) can be provided in in FIG. 4 to evaluate a width of pulses output from the signal amplifier 408 and to selectively pass only those pulses having a pulse width within a particular range. For example, such circuitry could be designed to pass on to comparator 412 only those pulses having a predetermined duration. Pulse width discriminator circuits as described herein are well known in the art and therefore will not be described in detail. However, it will be appreciated that such an arrangement could be used to effectively mask pulses output from the signal amplifier 408 that are of such short duration so as to indicate that they are merely transient noise and can be safely ignored.

In the embodiment in FIG. 4, the detected current signature vector components include a current rate of change and a current magnitude in sense resistor 116. An SEL signature in such a scenario can include a current rate of change which exceeds some predetermined value, and a current magnitude which also exceeds some predetermined magnitude. In the embodiment shown, these two vector components are concurrently evaluated in comparator 412 after suitable analog circuit conditioning of the current sensing signal. When a presence of these two detected signature vector components is identified concurrently, the ACC can use other signature vectors comprising other signature vector components (such as system state information) to determine with a high degree of reliability that SEL has occurred in the protected device.

Adaptive Threshold Setting

In some scenarios, an SEL event could occur during certain states associated with a protected device other than its operate state in which it is engaged in actually processing signals. Further, in some embodiments disclosed herein it has been assumed that a static threshold could be established and applied during the operate state of a protected device such as an FPGA. But it has been determined that such an assumption can in fact result in false or missed SEL detections. By accounting for variations in device state, plus variation in device processing load, SEL detection results can be obtained which are considerably more accurate under all conditions. By also taking consideration of factors such as device temperature and variations in fabrication processes, an SEL detection solution is provided that is less prone to such false or missed SEL detections. Accordingly, certain enhancements to an SEL detection solution will now be described in further detail.

The power draw of a device under protection from SEL can in some scenarios be a function of the device state and the dynamics of the signal processing. For example, consider a scenario in which the device which is to be protected from SEL is an FPGA. It is known that an FPGA can operate in accordance with a plurality of different states to facilitate various necessary operations. For example, these different states can include a: 1) power on quiescent state (FPGA is powered on but not configured), 2) a configuring state (during which executable code is loaded into the FPGA), 3) a data configuration state (during which software parameters are loaded), 4) a self-test state during which the FPGA executes certain coded self-test functions, 5) an idle state (during which the FPGA is ready and programmed but not actually performing any processing functions), and 6) an operate state (during which the fully configured FPGA actually performs the processing operations for which it is configured).

During one or more of the above-listed states the FPGA can potentially draw a different magnitude of electric current from a power supply input. As explained herein, these different magnitudes of electric current can be sensed and monitored in some scenarios relative to a threshold level to determine whether an SEL event has occurred. The actual threshold level used for this purpose is set based on an understanding of what a nominal current level is when the FPGA device is operating in each state. In other words, a different threshold level can be set for detecting the occurrence of SEL events which occur when the protected device is operating in each device state as referenced above. So a nominal current level or value associated with the operation of a protected device in a particular state can be one of a base set of signature vector components for each device state. This set of base signature vector components (which can include other information such as device state information and/or temperature) will together comprise a base signature vector for that state.

However, it has been determined that during at least the operate state referenced herein, the current consumption of a device such as an FPGA can fluctuate significantly based on signal loading. This fluctuation in current consumption can create difficulties for purposes of setting an appropriate threshold level to be used for evaluating whether an SEL event has occurred. A threshold level which may be appropriate for an FPGA operate state having a first signal loading condition may be unsuitable or result in a false SEL detection when applied to the same operate state, but a different signal loading condition.

As an example, an FPGA system may draw current A when searching for the presence of a data message in a received signal, but may draw current B when it actually detects the presence of a message in the received signal. The additional current draw is due to extra processing applied for message decoding, data thinning, data storage, and data downlink. An additional complicating factor is the current draw of a protected device can vary as a function of temperature and/or device fabrication processing variations. For example, at higher temperatures some FPGAs are known to draw more current. Similarly, variations in device manufacturing processes can cause inconsistency between different current draw by the different batches of the same device.

Figure 5:
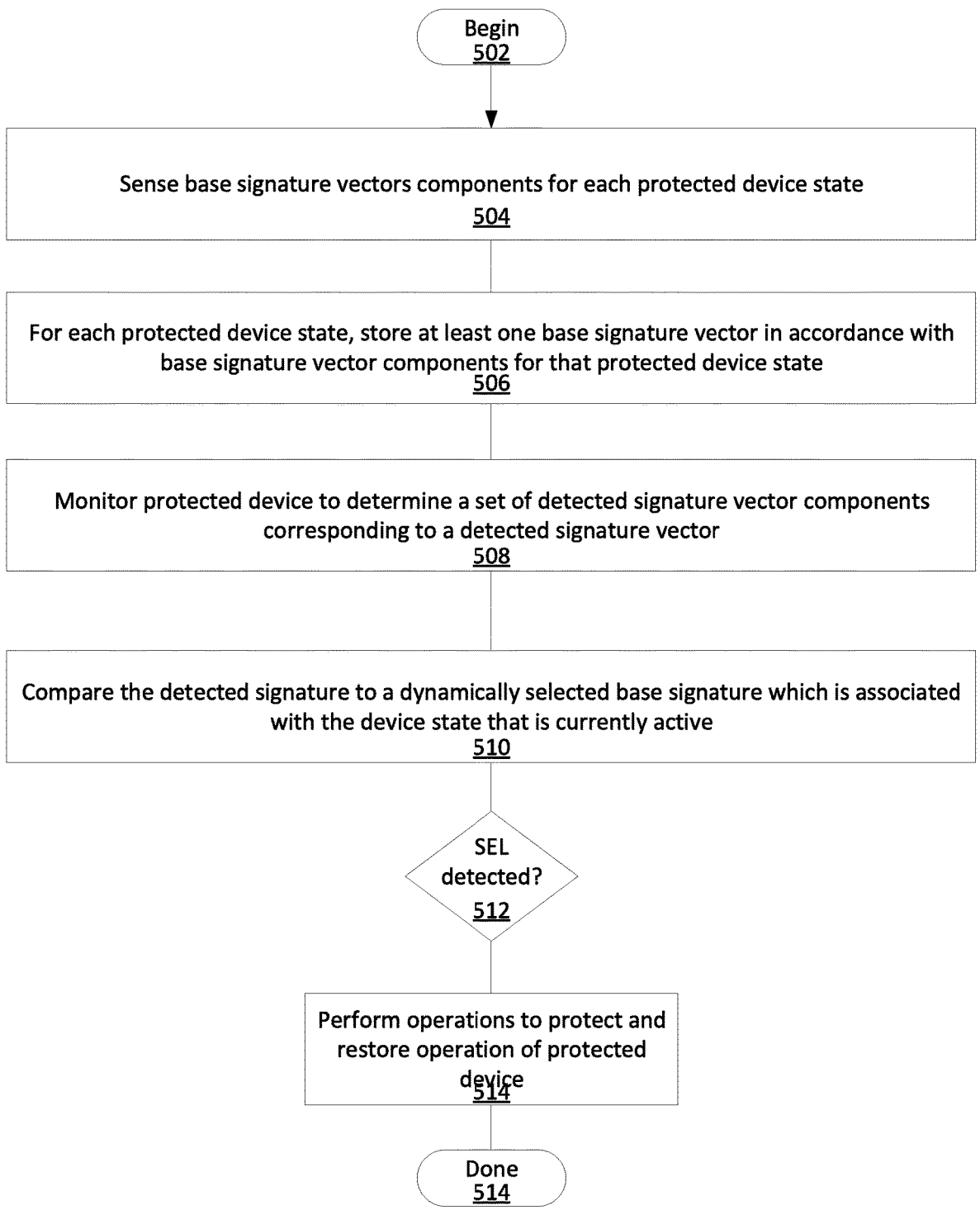
FIG. 5 is a flowchart that is useful for understanding an alternative method for adaptive surge protection.

Referring now to FIG. 5, there is a flowchart which is useful for understanding a method performed by a current surge mitigation system. The method begins at 502 and continues to 504 where base signature vector components are sensed for each of a plurality of protected device states. According to one aspect, these sensed signature vector components can include a state of a protected device, a value indicative of a magnitude of electric current being drawn by the protected device, a current rate of change, a figure of merit associated with a signal processing load of the protected device in a particular state, the temperature of the protected device, and/or any other signature vector component described herein which can be useful for evaluating whether an SEL event has transpired. The sensing operation can be performed with a sensing circuit. The process then continues to 506 where for each protected device state, at least one base signature vector is stored in accordance with the base signature vector components for that protected device state. In this regard it will be understood that a base signature vector can be comprised of a plurality of sensed signature vector component values (or values derived from or determined based on such signature vector components).

After the base signature vectors have been determined and stored for each state, the process continues at 508. This step involves monitoring (e.g., with the sensing circuit) a plurality of signature vector components for the protected device to determine a detected signature vector (which is comprised of a set of detected signature vector components). The signature vector components monitored or sensed during this step can be the same signature vector components which are used to establish the base signatures vectors. The monitoring operation described herein can occur during one or more of the device states associated with the protected device. For example it can occur during any one or more of the power on quiescent state, configuring state, data configuration state, self-test state, idle state and/or operate state.

At 510 a comparison is made between the detected signature vector and a dynamically selected base signature vector. According to one aspect, the dynamically selected base signature in step 510 can be selected based on a combination of both the currently active state of the protected device and the processing load which the protected device is currently experiencing within such state. In this regard it will be appreciated that two or more base signature vectors may be provided for the same device state (e.g., the operate state). In such a scenario, each of these base signature vectors can correspond to a different signal loading condition experienced by the protected device within the same state. A base signature vector is therefore selected in accordance with the active device state and the current level of signal loading. The level of signal loading can be communicated to the current mitigation system as a signature vector component value which comprises a processing figure of merit. Such a figure of merit can indicates directly or indirectly the processing load which the protected device is currently experiencing.

Based on the comparing step, a determination is made at 512 to selectively differentiate between the occurrence of standard current surges associated with normal operation of the protected device and a non-standard current surge (e.g., a current surge associated with an SEL event). In the event that an SEL event is identified at 512, the current mitigation system can perform one or more operations to protect the protected device from damage and restore the device to a proper operating condition (e.g., by automatically cycling the input power to the protected device). Such a cycling operation can involve powering down the protected device and then powering the device back to its nominal power input requirement.

As noted above, different base signature vectors can be dynamically selected within an protected device operating state in accordance with signal loading conditions. Within the context of a particular device state and signal loading condition, the accuracy of an SEL detection solution can be further improved by determining in steps 504 and 506 a plurality of different base signature vectors corresponding to different temperatures of the protected device. In other words an SEL detection solution can involve dynamically selecting from among two or more different base signature vectors applicable to the same combination of device state and signal loading, in accordance with the protected device operating temperature.

According to one aspect, the base signature vector information acquired at 504 and 506 can be acquired once for a particular type of protected device, after which the same set of base signature vectors can be used for all such protected devices in a particular application. However, variations in device fabrication processing can produce subtle changes in one or more signature vector components, such device current draw associated with various device states, temperature and signal loading conditions. Accordingly, the base signature vector acquisition performed at 504 and 506 can advantageously be performed automatically for each individual installed device so that more precise base signature vector information can be obtained. These individualized base signature vectors for each specific device can be determined for a plurality of unique combinations of device state, signal loading condition and operating temperature. In some scenarios, this process can be performed automatically. For example, the base signature vector information can be acquired automatically by measuring the set of base signature vector components for the protected device during at least one of a self-test and a manufacturing process. Further, the signature vector component information for various base signature vectors can be periodically updated after the protected device is installed in its intended operating environment. Accordingly, any variations due to equipment aging can be accounted for within each base signature vector.

In some scenarios, the comparing performed at 510 can be facilitated by analog devices. In such scenarios, it can be useful to set a threshold level (e.g., a voltage threshold) as a basis for comparing a particular signature vector component (e.g. current flow) to a baseline level. The particular threshold will be a function of the current draw of a protected device and an offset to meet a desired probability of detection and false alarm rate. However, in the solution disclosed herein, the base signature vector is dynamically selected in accordance with factors such as device state, signal loading, and operating temperature. Accordingly, it can be useful to dynamically set such analog voltage threshold automatically in accordance with a selected base signature vector. So the dynamic selection of a base signature vector can further involve automatically dynamically setting at least one voltage comparator threshold in accordance with a selected one of the base signature vectors to facilitate the comparing step.

The flowchart in FIG. 5 presents an SEL mitigation solution for a protected device which can have a plurality of active device states. But there are some scenarios in which a particular protected device may be understood to have only a single active state. In such instances, it is not necessary to determine base signature vectors for a plurality of protected device states. Instead, a solution for SEL mitigation can involve determining at least one set of base signature vector components for each of a plurality of signal loading conditions experienced by a protected device in the single active operating state. In an approach that is similar to the solution presented in FIG. 5, each set of base signature vector components will together comprise a base signature vector. In such a scenario, the electronic control unit or control logic circuit will monitor (e.g., with a sensing circuit) a plurality of signature vector components for the protected device. Such monitoring will facilitate determination of a detected signature vector which is comprised of a set of detected signature vector components. Thereafter, a processing element can automatically compare the detected signature vector to a dynamically selected base signature vector which is associated with the signal loading condition which are currently active. Based on the comparing operation, the processing element will selectively differentiate between the occurrence of standard current surges associated with normal operation of the protected device and a non-standard current surge.

Figure 6:
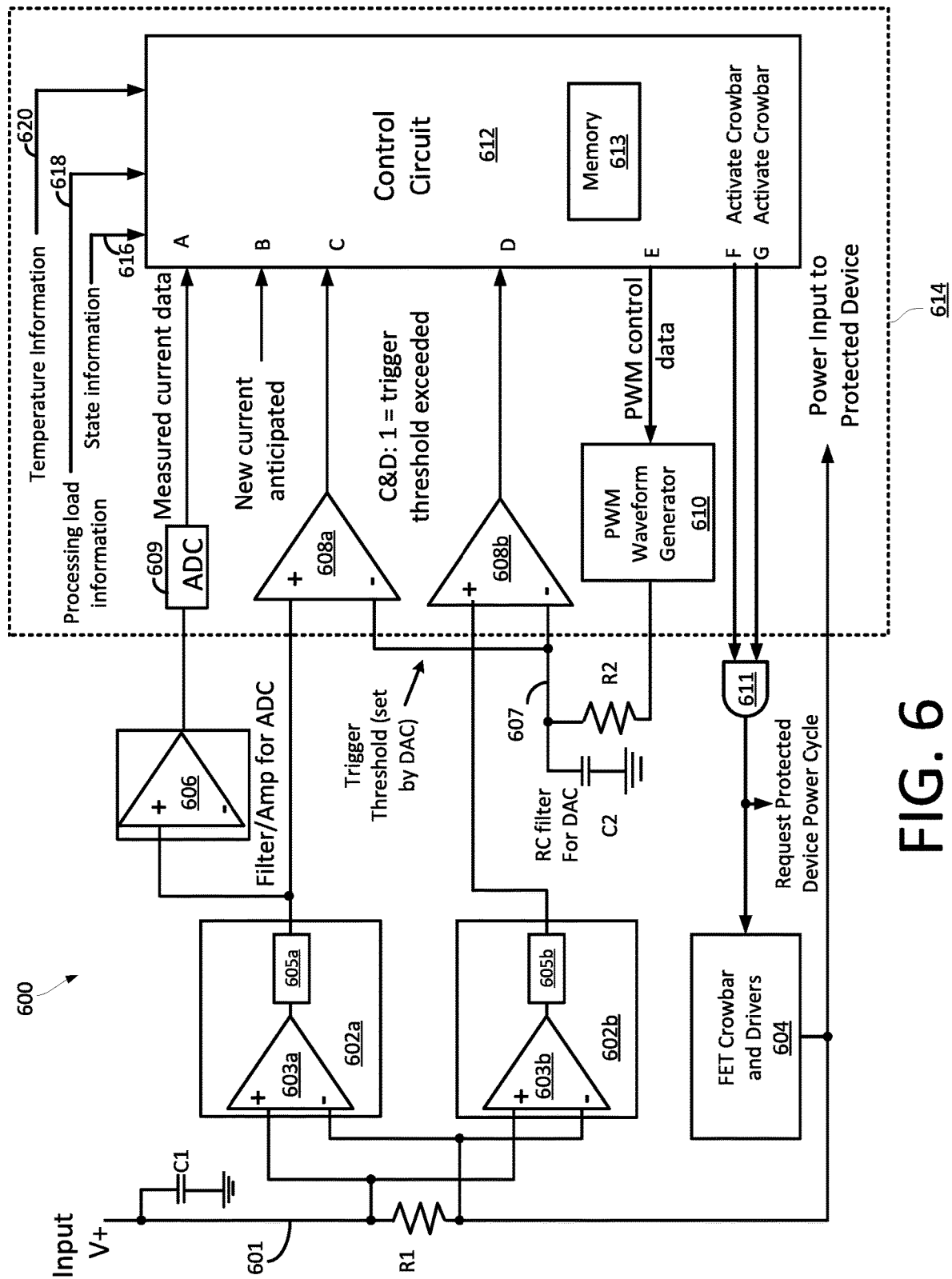
FIG. 6 is a circuit that is useful for understanding an implementation of an adaptive current surge mitigation system.

Referring now to FIG. 6 an example circuit is shown which is useful for understanding a current surge mitigation system (CSMS) which functions in accordance with the process described in FIG. 5. It should be appreciated that the example circuit is not intended to limit the solution presented herein in any respect. Instead, it should be understood that the solution can be implemented in any electronic circuit or system now known or known in the future which capable of carrying out the required operations. In FIG. 6 a CSMS 600 monitors and controls electric power supplied to a protected device by way of a power supply input line 601. The protected device can be entirely separate from the CSMS 600. However, in some scenarios, at least a portion 614 of the CSMS can be integrated with or be part of the protected device. In either scenario, power supplied to the protected device can optionally be filtered by at least one bypass capacitor, such as C1.

The CSMS 600 includes a sensing circuit which is configured to sense at least one set of base signatures vectors for each device state of a plurality of device states of a protected device. In this example the sensing circuit can include a current sensing resistor R1 and a pair of high-speed analog amplifiers and signal conditioning circuits 602a, 602b which use a voltage developed across R1 as a basis for indicating a magnitude of current flow. R1 in this scenario is preferably a relatively small value so as to produce only a minimal amounts of voltage drop. For example, R1 can have a value of 0.05 Ohms. The voltage developed across R1 is amplified and filtered by circuits 602a, 602b. In some scenarios, circuits 602a, 602b can each include a signal conditioning circuit 605a, 605b. The signal conditioning circuits 605a, 605b can be similar to the signal conditioning circuit 414 described herein with respect to FIG. 4. Consequently, the output of the circuits 602a, 602b can comprise a pulsed signal having a pulse amplitude. The pulse amplitude will be proportional to the magnitude and rate of change in current indicated by the output from the high speed analog differential amplifiers 603a, 603b. Once the pulsed signals are generated, they can be passed to comparators 608a, 608b, which function as threshold detectors. Of course, other solutions are possible and in some scenarios the signal conditioning and comparator operations described herein can be performed in the digital domain by the control circuit 612.

For purposes of acquiring the base signature vectors an additional filter/amplifier stage 606 can be provided to produce an input suitable for analog-to-digital-converter (ADC) 609. The resulting measured current data can be communicated to an electronic control circuit 612 as one of the base signature vector components. In addition to current magnitude information provided by the ADC the electronic control circuit 612 can receive one or more other signature vector components for purposes of determining or generating a base signature vector. For example, it can receive protected device state information, protected device processing load information, and protected device operating temperature data. If the protected device is external from the CSMS 600 this information can be provided to the electronic control circuit 612 by external inputs 616, 618 and 620. However, in a scenario in which the electronic control circuit 612 comprises a part of the protected device, the information can be internally available to the control circuit 612 such that no external inputs are necessary with respect to this data. The combination of signature vector components corresponding to different conditions are stored as base signature vectors by the control circuit 612 in a memory location (e.g. memory 613).

The electronic control circuit 612 can be any suitable electronic system that is capable of carrying out one or more of the functions described herein. As such, the electronic control circuit can include one or more devices such as a field programmable gate array (FPGA), a central processing unit (CPU), an application specific integrated circuit (ASIC), a programmable logic device, a digital signal processor, or other circuit programmed to perform the functions described. The electronic control circuit can comprise a digital controller, an analog controller or circuit, an integrated circuit (IC), a microcontroller and/or may be comprised of discrete electronic components.

Once the base signature vector information has been stored, the CSMS 600 can begin monitoring for the occurrence of an SEL event. This monitoring step involves sensing one or more detected signature vector components which taken as a whole comprise a detected signature vector. For example, the voltage outputs of circuits 602a, 602b representing current magnitude is communicated to a corresponding pair of comparators 608a, 608b. According to one aspect, the comparators 608a, 608b can be low voltage differential signaling (LVDS) line receivers 608a, 608b associated with a device such as an FPGA.

A threshold voltage developed at 607 is applied to one input of each of the comparators 608a, 608b. This threshold voltage is used in a comparing step as a basis for determining whether current through R1 exceeds a predetermined magnitude. It should be noted that dual analog comparators 608a, 608b are used here to ensure that a single event transient (SET) in one of the line receivers 608a, 608b will not cause a false alarm. In this regard, an overcurrent condition will only be triggered in a control circuit 612 if the output voltages of the comparators 608a, 608b are both in a high state or 1 condition. The use of dual high-speed analog amplifiers and noise filtering circuits 602a, 602b can be advantageous for similar reasons. Consequently, it will be understood that the current sensing circuit includes redundant components for at least one of sensing and evaluating the detected electric current.

The control circuit 612 will use one or more of the detected signature vector components to dynamically select one of the plurality of base signature vectors associated with the active state of the protected device. In some scenarios, this step can involve a determination of the protected device state, its signal loading condition, and its operating temperature. For example, the selected base signature vector can be comprised of signature vectors components which most closely match one or more detected signature vector components such as the active device state, device signal and/or processing load, and device operating temperature.

Once a particular base signature vector has been selected for comparison purposes, the control circuit 612 can set a threshold voltage to be used by comparators 608a, 608b. In some scenarios, this threshold voltage can be set by means of a conventional digital-to-analog-converter (DAC). In other scenarios it can be more convenient and/or economical to produce a DC threshold voltage using pulse-width-modulated (PWM) waveform. The PWM waveform can be generated by a high-resolution PWM 610 responsive to control data communicated from the control circuit 612. The resulting PWM waveform can be applied to an RC filter comprised of R2 and C2 to develop a DC threshold voltage at 607. The values of R2 and C2 can be selected to provide a suitable DAC accuracy. For example, in some scenarios the C2 can have a value of 0.1 μF and R2 can have a value of 100 Ohms.

The control unit 612 will compare the detected signature vector to the base signature vector which has been selected so as to differentiate between the occurrence of a standard current surge associated with normal operation of the protected device and a non-standard current surge. It will then generate an output signal based on the comparing. For example, in FIG. 6 outputs F and G can comprise enable signals to activate an FET crowbar and driver circuit 604. Dual enable signals can be used for this purpose. These dual enable signals can be communicated to a logical AND gate 611 so that the crowbar circuit 604 will not be activated unless both enable signals are in a 1 or high state. The dual enable signals ensure that an SET event will cannot result in inadvertently triggering the crowbar and driver circuit 604. The FET crowbar and driver circuit 604 when activated will prevent permanent damage, provided that the SEL current surge is interrupted by the crowbar circuit within approximately 1 μS.

The inventive arrangements have been described herein with reference to differentiating SEL type power surges from other types of power surges. However, it should be understood that the invention is not limited in this regard. The inventive techniques described herein can be applied in any case where it is advantageous to differentiate between the occurrence of standard power surges associated with normal operation of a protected device and other types of power surges. The invention is particularly useful for differentiating standard power surges from non-standard power surges (such as power surges associated with SEL) where the current surge indicates a need to cycle power of the protected device to ensure its continued proper functioning.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

We claim:

1. A method for SEL mitigation, comprising:
   determining with a sensing circuit at least one set of base signature vector components for each device state of a plurality of device states of a protected device, each set of base signature vector components together comprising a base signature vector;
   monitoring with the sensing circuit a plurality of signature vector components for the protected device to determine a detected signature vector which is comprised of a set of detected signature vector components;
   using an electronic control unit to
   compare the detected signature vector to a dynamically selected base signature vector which is associated with the device state that is currently active; and
   based on the comparing step, selectively differentiate between the occurrence of standard current surges associated with normal operation of the protected device and a non-standard current surge.

2. The method according to claim 1, further comprising selecting the plurality of device states from the group consisting of power on quiescent, configuring the protected device, configuration, self-test mode, idle mode, and operate mode.

3. The method according to claim 2, further comprising determining a plurality of different base signature vectors for at least the operate mode of the protected device.

4. The method according to claim 3, wherein the plurality of different base signature vectors for the operate mode each correspond to a different signal loading condition of the protected device.

5. The method according to claim 4, further comprising selecting at least one of the signature vector components to include a figure of merit which is indicative of an extent of signal loading which is experienced by the protected device.

6. The method according to claim 4, further comprising determining for each signal loading condition a plurality of different base signature vectors, each corresponding to different temperatures of the protected device.

7. The method according to claim 1, further comprising determining one or more of the plurality of base signature vectors for the protected device individually for each protected device so as to obtain base signatures vectors for the protected device which account for fabrication processing variations.

8. The method according to claim 7, wherein the at least one set of base signatures vector components for each device state of a plurality of device states is determined by automatically measuring the set of base signature vector components for the protected device during at least one of a self-test and a manufacturing process.

9. The method according to claim 7, further comprising automatically dynamically setting at least one voltage comparator threshold based on a selected one of the base signature vector components to facilitate the comparing step.

10. A current surge mitigation system for ensuring reliable operation of a protected device, comprising:
   a sensing circuit which is configured to sense
      at least one set of base signature vector components for each device state of a plurality of device states of a protected device; and
      at least one set of detected signature vector components associated with an active state of the protected device; and an electronic control unit configured to
- store for each of the device states a base signature vector in accordance with the set of base signature vector components sensed by the sensing circuit;
- monitor the detected signature vector components associated with the active device state to determine a detected signature vector;
- dynamically select one of the plurality of base signature vectors associated with the active device state;
- compare the detected signature vector to the base signature vector which has been selected to differentiate between the occurrence of a standard current surge associated with normal operation of the protected device and a non-standard current surge; and
- generate an output signal based on the comparing.

11. The current surge mitigation system according to claim 10, further comprising at least current control circuit responsive to the output signal and configured to selectively prevent an overcurrent condition associated with the non-standard current surge.

12. The current surge mitigation system according to claim 10, wherein the plurality of device states are selected from the group consisting of power on quiescent, configuring the protected device, configuration, self-test mode, idle mode, and operate mode.

13. The current surge mitigation system according to claim 12, wherein the electronic control unit is configured to store a plurality of different base signature vectors for at least the operate mode of the protected device.

14. The current surge mitigation system according to claim 13, wherein the plurality of different base signature vectors for the operate mode each correspond to a different signal loading condition of the protected device.

15. The current surge mitigation system according to claim 14, wherein at least one of the signature vector components is comprised of a figure of merit which is indicative of a current extent of signal loading which is experienced by the protected device.

16. The current surge mitigation system according to claim 14, wherein the electronic control unit is configured to determine for each signal loading condition a plurality of different base signature vectors, each corresponding to different temperatures of the protected device.

17. The current surge mitigation system according to claim 10, wherein the electronic control unit is configured to determine one or more of the plurality of base signature vectors individually for each protected device so as to obtain base signature vectors for the protected device which account for fabrication processing variations.

18. The current surge mitigation system according to claim 17, wherein electronic control unit is configured to determine the at least one base signature vector for each device state automatically during at least one of a self-test and a manufacturing process.

19. The current surge mitigation system according to claim 17, wherein the electronic control unit is configured to facilitate automatically dynamically setting at least one voltage comparator threshold in accordance with a selected one of the base signature vectors.

20. The current surge mitigation system according to claim 10, wherein the sensing circuit is comprised of a current sensing circuit which is configured to detect electric current flowing to the protected device, the current sensing circuit including redundant components for at least one of sensing and evaluating the detected electric current.

21. The current surge mitigation system according to claim 10, wherein the electronic control unit is configured to concurrently generate the output signal which include a first and second redundant output signal.

22. The current surge mitigation system according to claim 21, further comprising at least one logic element which is configured to prevent enablement of a mitigation control signal in the presence of only a single one of the first and second redundant output signal.

23. A method for SEL mitigation, comprising:
- determining with a sensing circuit at least one set of base signature vector components for each of a plurality of signal loading conditions experienced by a protected device in an operating state, each set of base signature vector components together comprising a base signature vector;
- monitoring with the sensing circuit a plurality of signature vector components for the protected device to determine a detected signature vector which is comprised of a set of detected signature vector components;
- using an electronic control unit to
- compare the detected signature vector to a dynamically selected base signature vector which is associated with the device state and signal loading condition which are currently active; and
- based on the comparing step, selectively differentiate between the occurrence of standard current surges associated with normal operation of the protected device and a non-standard current surge.

24. The method according to claim 23, further comprising selecting at least one of the signature vector components to include a figure of merit which is indicative of an extent of signal loading which is experienced by the protected device.

25. The method according to claim 24, further comprising determining for each signal loading condition a plurality of different base signature vectors, each corresponding to different temperatures of the protected device.

26. The method according to claim 25, further comprising determining one or more of the plurality of base signature vectors for the specific protected device individually to account for fabrication processing variations.

* * * * *